Patented Mar. 17, 1942

2,276,409

UNITED STATES PATENT OFFICE 2,276,409

MILK SOAP

John E. McCormick, Chicago, Ill., assignor to Edward J. McLaughlin, trustee

No Drawing. Application December 13, 1939, Serial No. 308,947

15 Claims. (Cl. 252—130)

This invention relates to improvements in whole milk soap creams and in processes of producing whole milk soaps. This application is a continuation in part of my co-pending application Serial No. 142,199 filed May 12, 1937, for Milk soap.

The main objects of the present invention are to provide a soap in which fresh whole milk is the principal ingredient; to provide a stable milk soap emulsion which contains the emollient values and qualities of whole milk; to provide a soap containing at least 80% whole milk; to provide a jelly-like soap containing at least 80% whole milk and an amine soap of a fatty acid, a hydrogenated oil or fat having a high melting point and a preservative, the latter two ingredients being present in an amount less than the amine soap; to provide a jelly-like soap containing at least 80% whole milk and an amine soap of a fatty acid, a hydrogenated oil having a high melting point, a preservative, and sweet cream buttermilk powder, the latter three ingredients being present in an amount less than the amine soap; to provide an anhydrous soap emulsion based upon the mixture of two definite basic compositions and milk; to provide a milk soap emulsion which is soluble in water; to provide a detergent which is readily soluble in milk; to provide a milk soap emulsion which will act as a skin softener by imparting oils to the skin and at the same time have a detergent power; and to provide a simple and inexpensive method of producing a whole milk soap emulsion.

Another important object of this invention is to form the two basic compositions, used in producing any improved milk soap, in such a manner that they may each be produced in quantities, and stored away and to be used in any quantity desired whenever the final product of milk soap is to be formed.

Another object of this invention is to provide a milk soap containing a maximum amount of the most desirable constituents of milk.

My invention consists in the method of preparing a soap base and admixing it with at least 80% whole sweet milk and a preservative.

I have found that the pH of whole sweet milk varies under numerous conditions and it is necessary therefore to "standardize" the same. As the normal pH of fresh whole sweet milk is approximately 6.85 I adjust the value of the whole sweet milk to be used in producing my milk soap to a pH of 6.85 by adding a suitable buffer, such as magnesium hydroxide to the same.

The base used in my process and product consists principally of an admixture of an amine soap of a fatty acid and a hydrogenated oil or fat having a high melting point.

An illustrative base composition consists substantially of:

34.8 pounds (58%) of a fatty acid
17.4 pounds (29%) of an amine
7.8 pounds (13%) of a hydrogenated oil or fat having a high melting point.

The fatty acid employed is preferably, commerical stearic acid, although any of the soap-forming fatty acids of the series of saturated acids having the formula ($C_nH_{2n}O_2$) may be used. The characteristics of the fatty acid influences the viscosity of the product. In this preferred formula commercial grades of stearic acid are preferable because a heavy viscous bodied product is desired. Oleic or peanut fatty acid may be used if the product to be produced is to be less viscous than the product resulting from the employment of stearic acid.

The amine employed is preferably triethanolamine because of its low cost and availability; however, any of the commercial forms of the ethanolamines such as monoethanolamine, diethanolamine or iso-propylolamine may be used in combination with any of the soap-forming fatty acids to provide a satisfactory base. Each of the amines will combine with the fatty acids according to their respective molecular weights as for example, 149.16 parts of triethanolamine will combine with 282.27 parts of oleic acid. In all cases, however, the combining weights of the fatty acid and amine are determined by titration.

The hydrogenated oil employed is preferably hydrogenated castor oil because of its very high melting point. Other hydrogenated oils may, however, be used, such as vegetable oils of cocoanut oil type, as for example, palm kernel oil, olive oil, etc. I have found that the use of certain hydrogenated fats used in the amounts indicated in my example have a tendency to materially increase and stabilize the consistency of the finished product over a wide temperature range.

In preparing the base composition the fatty acid, which is solid at normal temperatures, is melted, and the amine added thereto. The mixture becomes heavy and viscous and is continuously agitated, while the temperature is raised to 140° F. When the bubble evolution begins the oil is then added thereto. During this entire admixing process the temperature of the solution is maintained substantially constant at about 140° F.

The formula of the final product consists substantially of 344 pounds (80%) of sweet whole milk
60 pounds (14%) of the base, as prepared in the above disclosure
20 pounds (4.5%) of sweet cream buttermilk powder
3.5 pounds (0.8%) of a preservative
½ to 1% (an average of 0.7%) of the total weight of the perfume oils to scent.

To combine the above, the whole milk is first "standardized" by adjusting the pH to a value of 6.85 as heretofore described. The whole milk and the preservative are then thoroughly admixed together in the presence of heat in a suitable mixer, the temperature being raised to 170° F. and maintained for a period of one hour during which time the admixture is continuously agitated.

After the first period of heating, the temperature of the mixture is gradually increased to 190° F. and the base, in liquid state, added thereto. This admixture is then thoroughly agitated and maintained until a complete dispersion takes place. The temperature of the admixture is then reduced to 150° F. at which time the sweet cream buttermilk powder and the perfume oil are added thereto.

When this resultant admixture is well dispersed, the heat is removed and the admixture is passed through a colloid mill, of any standard commercial make. The colloid mill is preferably set to a fineness of 4 microns. The finished product will be found to be much lighter in color after it passes through the colloid mill and is jelly-like and creamy. The product may be drawn off from the colloid mill directly into the commercial containers which are to be distributed to the public.

If by any chance, coagulation takes place during the first period of heating (milk and preservative) a small quantity of base is immediately added thereto and the mixture will return to complete solution.

The preservative employed is one of the boron-containing compounds, preferably boric acid, because of its availability on the open market and because it is a highly standardized product. While it is a weak preservative, it is physiologically safe. Other boron-containing compounds such as borates for example could be employed. I have found that a preservative is not highly essential because the sterile amine soaps form sterile colloid. When a sterile colloid combines with all of the water present, it then becomes impenetrable to bacteria. They cannot move in it and their digestive enzymes cannot penetrate it.

Further, bacteria will not penetrate these jelly-like masses.

It is an inherent characteristic of a solidified hydrated colloid that bacteria cannot penetrate it, even if it contain abundant water for their growth. If the bacteria are scattered through the liquid state before it solidifies, each organism will grow into a colony, but if the mass is sterile, the bacteria may cause a surface growth which, however, remains on the surface and does not penetrate.

Two examples of satisfactory alternate preservatives are normal butyl parahydroxybenzoate in concentration of 0.02% and ethyl silicate in concentration of 0.01%.

I have found that any of the preservatives which are not otherwise harmful may be used and that their function is to prevent surface contamination after the final product has been partially consumed. It is my observation that vegetative organisms, principally yeasts, are much harder to guard against and as their effects are purely surface, they are quite adequately guarded against by boric acid.

Without a doubt, the amine soaps form many highly complex colloidal forms in milk and the behavior of the substance described in my disclosures leads me to believe that the amine soap combines with or at least influences the behavior of casein in the milk. As I have pointed out, the material will keep without boric acid or other preservatives and I attribute this to the fact that the amine soap in the presence of water lowers the surface tension to a point where the casein is thoroughly covered by the soaps or it may be that the amine soaps act as a hydrating agent and cause the casein to go into solution.

The sweet cream milk powder is a standard commercial product readily found on the open market. The approximate composition thereof is:

|  | Per cent |
|---|---|
| Butter fat | 6 |
| Lactose | 50 |
| Protein | 33 |
| Minerals | 6½ |
| Moisture | 4 |
| Lecithin | 1.63 |

Its purpose herein is to impart increased emollient properties to the final product and to the final product and to provide a finished product containing a maximum amount of specifically desirable constituents of milk, such as the minerals for the bleaching action and the butter fats containing lecithin. The lecithin content in this type of powder is very high and has definite emulsifying properties. Lecithin in this form has an emollient effect on human skin.

An alternative process of producing my improved milk soap product can be accomplished by forming a jelly-like soap containing substantially at least 80% whole milk having present at least 3½% butter fat, an ethanolamine soap of a fatty acid, a hydrogenated oil or a vegetable oil of cocoanut oil type, a lower alkyl glycol and a preservative such as a boron containing compound, for example, boric acid, wherein the latter three ingredients are present in an amount less than the ethanolamine soap.

In this process I employ two types of soap, one containing an amine and a soap-forming fatty acid to which a preservative and a lower alkyl glycol are added, and the other containing an amine, a soap-forming fatty acid, a lower alkyl glycol and a vegetable oil having a high melting point such as hydrogenated cocoanut or castor oil. These two soaps form "bases" which are separately prepared and are each admixed with the milk in definite proportion, i. e., to every 34.4 ounces of whole milk, 2½ ounces of the first base and four ounces of the second base are added. With the exception of the substitution of the lower alkyl glycol for the sweet cream buttermilk powder the resultant product as is apparent is the same as the one herebefore first described.

This process consists of the method of mixing and preparing a detergent, one composition which has had a preservative such as boric acid added to it which acts as a stabilizing compound and the second composition which contains a slight excess of fatty acid which will increase the stability of the emulsion, and a vegetable oil, such as a hydrogenated oil of the cocoanut oil type.

Basic composition No. 1 consists of substantially:

| | Ounces |
|---|---|
| Fatty acid | 16 |
| Amine | 8½ |
| Lower alkyl glycol | 1 |
| Preservative | 5 |

The fatty acid is preferably commercial stearic acid, having a combining weight of 269 and a melting point of approximately 130° F. It will be noted that the amine is in excess of the combining weight required for complete saponification of the fatty acid, which greatly facilitates the solution of the boric acid into soap composition.

In the preparation of basic compound No. 1, the fatty acid, which is solid at normal temperatures, is melted, and the amine, preferably an ethanolamine such as triethanolamine, is added thereto. The solution becomes heavy and viscous and is continuously agitated, while under the action of heat, until the beginning of the bubble evolution. When the bubble evolution begins the glycol, preferably a propylene glycol, is added thereto which reduces the viscosity of the solution. During this entire admixing process the temperature of the solution is maintained substantially constant at about 140° F.

The temperature of the solution is now raised to substantially 190° F. and thereafter maintained at this point. The preservative, preferably a boron containing compound such as boric acid is then slowly added thereto while the solution is vigorously agitated. The temperature is kept substantially constant at about 190° F., at which temperature the boric acid appears to go into complete solution.

After the solution has taken up the boric acid it is allowed to cool and the solution will harden at about room temperature.

Basic composition No. 2 is separately prepared and consists of:

17 ounces of a fatty acid
8 ounces of an amine
2 ounces of a hydrogenated oil
1 ounce of a lower alkyl glycol (to which scent may be added)

The fatty acid is composed of 44% stearic acid, 50% palmitic acid and 6% iso-oleic acid as in basic composition No. 1.

The fatty acid is changed to a liquid in the same manner as in basic composition No. 1 by raising the temperature to substantially 140° F.

After the fatty acid has changed to liquid form, the temperature is maintained at substantially 140° F., and the amine preferably triethanolamine is then introduced into the liquid fatty acid. The solution is vigorously agitated until the two liquids are thoroughly combined. The vegetable oil having a high melting point, preferably a hydrogenated oil of the cocoanut oil type is then added to this solution. The temperature of the solution is then lowered to below 130° F. and the lower alkyl glycol preferably propylene glycol added, and gently stirred thereinto. The solution is now allowed to cool and it will harden at substantially room temperature.

Temperature control is very important in preparing these two basic compositions and care must be exercised in admixing and heating the same in order to obtain the most successful results and also to prevent discoloration of the solution.

The final mixture to obtain my improved milk soap emulsion comprises substantially:

2½ ounces of No. 1 basic composition
4 ounces of No. 2 basic composition
34.4 ounces of whole milk containing at least 3½% butter fat The temperature of the milk is raised to approximately 143° F. and the basic composition No. 1 added thereto. The temperature of this solution is then raised, slowly, to approximately 170° F. and maintained at this temperature until the No. 1 basic composition has been thoroughly dissolved and taken up by the milk. The solution is then transferred to another tank and the temperature of the solution reduced to approximately 150° F. The No. 2 basic composition is then added to the solution. At this point the solution is thoroughly agitated until the basic composition No. 2 is dissolved and taken up by the solution. This agitation is continued until the solution becomes a homogenous mass at which time it is drawn off in suitable containers and allowed to cool.

By the addition of the boric acid to the No. 1 basic composition it materially increases the melting point of the compound above the melting point of the fatty acids used. In order to economically combine the No. 1 composition with the milk, the temperature of the milk should be slowly increased from approximately 143° to 170° F. after the No. 1 composition has been added thereto. If the temperature is slowly raised casein is not deposited and the milk is not scorched. It is important to increase the heat gradually as the solution progresses. It has been found that not less than 30 minutes should elapse between raising the temperature of from 143° F. to 170° F. and during the raising of the temperature the solution is thoroughly and continuously agitated. The solution has been found to become heavy and viscous, having a creamy colored appearance. The solution is then cooled and the solution takes on a jelly-like form. The milk soap then is ready for distribution and use.

The whole milk soap now produced has been found to be an emulsion in which the water portion contained in the milk is in a continuous phase while the oils, including that portion of the uncombined butter fat, is in a disperse phase. The emulsion has been found to be very stable and results in a detergent product which combines the selective cleansing qualities of water and oil.

By rechecking the formulae it will be found that basic composition No. 1 does not contain any oil serving as a scenting agent that is not soluble in water. The reason for this is that if the boric acid is to be quickly and freely soluble in milk all of the other substances with which it is combined must also be freely soluble in milk. It has been found, after numerous experiments, that the presence of even minute quantities of oils prevent, to some extent, the free solution of boric acid, hence the ingredients in basic composition No. 1, all of which are critical in nature and proportion and each essential to the preparation of this composition.

The basic composition No. 2 contains a hydrogenated oil and an oil serving as a scenting agent, and an excess of fatty acid. The purpose of having the hydrogenated oil present in composition No. 2 is to form an emulsion when this composition is added to the admixture composed of basic composition No. 1, and milk.

From a commercial standpoint, the final product should be as stiff and jelly-like as possible, and therefore the controlling factor, in obtaining this end, is the titer of the fats used. It will be noted from the above two basic compositions that an excess of fatty acid is employed in the No. 2 base. This is to insure a more stable emulsion when the final product is prepared.

It can readily be seen to those skilled in the art that for commercial reasons any other acids of the fatty acid group of the series of saturated acids having the formula $(C_nH_{2n}O_2)$ may be substituted for the fatty acids used in the above-described formulae.

Hydrogenated oils and vegetable oils other than the hydrogenated cocoanut or castor oils may also be substituted for commercial reasons. Having set forth hydrogenated cocoanut and castor oils as illustrative oils, they may be successfully used in the composition, but it is obvious to chemists skilled in the art that the chemical and physical equivalents thereof may be substituted. The expression "hydrogenated oil" of the cocoanut oil type is intended to include those oils characterized by their high saponification values.

Mercury salts, especially the chloride, is useful in preventing the souring of milk, but boric acid is used because it is bland and not injurious to the human eye. The glycols, notably the propylene, are also useful in preventing the souring and molding of milk but as is true of the alcohols, they seem to have a drying effect on the skin.

It is also to be understood that the above-described processes and methods are preferably to be carried out under the most favorable sterile conditions to insure success.

It is to be understood that some of the details set forth may be altered or omitted without departing from the spirit of the invention as defined in the following claims.

I claim:

1. A stable jelly-like soap composition comprising the reaction mixture of at least 80% whole milk, an alkylol amine soap of a fatty acid, a hydrogenated oil having a relatively high melting point to stabilize the product over a wide temperature range, and a sweet cream butter-milk powder, the latter two ingredients being present in amounts less than the amine soap.

2. A stable jelly-like soap composition comprising the reaction mixture of at least 80% whole milk, an amine soap of a fatty acid, a hydrogenated oil having a relatively high melting point to stabilize the product over a wide temperature range, and a sweet cream butter-milk powder, the latter two ingredients being present in amounts less than the amine soap.

3. A stable jelly-like soap composition comprising the reaction mixture of at least 80% whole milk, an amine soap of the saturated acid series having the formula $C_nH_{2n}O_2$ a hydrogenated vegetable oil and sweet cream butter-milk powder, the latter two ingredients being present in amounts less than the amine soap.

4. A stable jelly-like soap composition comprising the reaction mixture of at least 80% whole milk having at least 3½% of butter fat, an amine soap of a fatty acid, a non-volatile vegetable oil, and a sweet cream butter milk powder, the latter two ingredients being present in an amount less than the amine soap.

5. A stable jelly-like soap composition comprising the reaction mixture of at least 80% whole milk, an amine soap of a fatty acid, a non-volatile vegetable oil, and a sweet cream butter milk powder, the latter three ingredients being present in an amount less than the amine soap.

6. A jelly-like soap containing at least 80% whole milk having present at least about 3½% of butter fat, an ethanolamine soap of a fatty acid, a hydrogenated oil of the cocoanut oil type, a lower alkyl glycol, and boric acid, the latter three ingredients being present in an amount less than the ethanolamine soap.

7. A stable jelly-like soap composition comprising the reaction mixture of at least 80% whole milk having present at least about 3½% of butter fat, an alkylol amine soap of a fatty acid, and a hydrogenated oil having a high melting point, a lower alkyl glycol, the latter two ingredients being present in an amount less than the alkylol amine soap.

8. A stable jelly-like soap composition comprising the reaction mixture of at least 80% whole milk having present at least about 3½% of butter fat, an ethanolamine soap of a fatty acid, hydrogenated cocoanut oil, a lower alkyl glycol, and boric acid, the latter three ingredients being present in an amount less than the ethanolamine soap.

9. A stable jelly-like soap composition resulting from a mixture of about 84% whole milk containing at least about 3½% of butter fat, about 6% of a composition comprising an ethanolamine soap of a fatty acid, a lower alkyl glycol and boric acid; and about 10% of a composition comprising an ethanolamine soap of a fatty acid and having present hydrogenated cocoanut oil and a lower alkyl glycol, the ethanolamine soap of the final mixture being present in an amount greater than the remaining non-milk constituents.

10. A stable jelly-like soap composition resulting from a mixture of about 84% whole milk containing at least about 3½% of butter fat, about 6% of a composition comprising an ethanolamine soap of a fatty acid, propylene glycol and boric acid; and about 10% of a composition comprising an ethanolamine soap of a fatty acid and having present hydrogenated cocoanut oil and propylene glycol, the ethanolamine soap of the final mixture being present in an amount greater than the remaining non-milk constituents.

11. A stable jelly-like soap composition resulting from a mixture of about 84% whole milk containing at least about 3½% of butter fat, about 6% of a composition comprising an ethanolamine soap of a fatty acid, a lower alkyl glycol and a preserving agent inhibiting the souring or molding of the milk; and about 10% of a composition comprising an ethanolamine soap of a fatty acid and having present hydrogenated cocoanut oil and a lower alkyl glycol, the ethanolamine soap of the final mixture being present in an amount greater than the remaining non-milk constituents.

12. The method of making a stable jelly-like soap composition having present at least 80% whole milk containing at least about 3½% of butter fat and an ethanolamine soap, comprising heating the whole milk containing at least about 3½% of butter fat to about 143° F., adding to the milk about 6% of a composition comprising an ethanolamine soap of a fatty acid, a lower alkyl glycol and boric acid, heating the mixture to about 170° F. while inhibiting the deposition of casein and scorching of the milk, reducing the temperature of the mixture to about 150° F., and adding to the resulting mixture about 10% of a composition comprising an ethanolamine soap of a fatty acid, hydrogenated cocoanut oil, and a lower alkyl glycol.

13. The method of making a stable jelly-like soap composition having present at least 80% whole milk containing at least about 3½% of butter fat, an ethanolamine soap and other ingredients, the soap being present in an amount greater than said other ingredients, comprising heating whole milk containing at least about 3½% of butter fat to about 143° F., adding to the milk the heat-treated composition made from the mixture of 53% soap forming fatty acid
28% triethanolamine
3% propylene glycol
18% boric acid heating the resulting mixture to about 170° F. while inhibiting the deposition of casein and scorching of the milk, reducing the temperature of the mixture to about 150° F., adding to the resulting mixture the heat-treated composition made from the mixture of 61% fatty acid
28% triethanolamine
7% hydrogenated cocoanut oil
4% propylene glycol to which scent has been added.

14. The method of making a stable jelly-like soap composition having present at least 80% whole milk containing at least about 3½% of butter fat and an alkylol amine soap comprising heating the whole milk containing at least about 3½% of butter fat to about 143° F., adding to the milk about 6% of a composition comprising an alkylol amine soap of a fatty acid, and a lower alkyl glycol heating the mixture to about 170° F. while inhibiting the deposition of casein and scorching of the milk, reducing the temperature of the mixture to about 150° F., and adding to the resulting mixture about 10% of a composition comprising an alkylol amine soap of a fatty acid and a hydrogenated vegetable oil.

15. A stable jelly-like soap composition comprising the reaction mixture of at least 80% milk having present at least 3½% of butterfat, an alkylol amine soap of a fatty acid, a hydrogenated oil having a high melting point and a lower alkyl glycol, the latter two ingredients being present in an amount less than the alkylol amine soap.

JOHN E. McCORMICK.